June 18, 1940.  D. G. RENNO ET AL  2,204,697
VEHICLE BODY
Filed July 25, 1939  2 Sheets-Sheet 1

Inventors
Donald G. Renno
and Chris J. Fields
By Paul O. Pippel
Atty.

June 18, 1940.        D. G. RENNO ET AL        2,204,697
VEHICLE BODY
Filed July 25, 1939        2 Sheets-Sheet 2
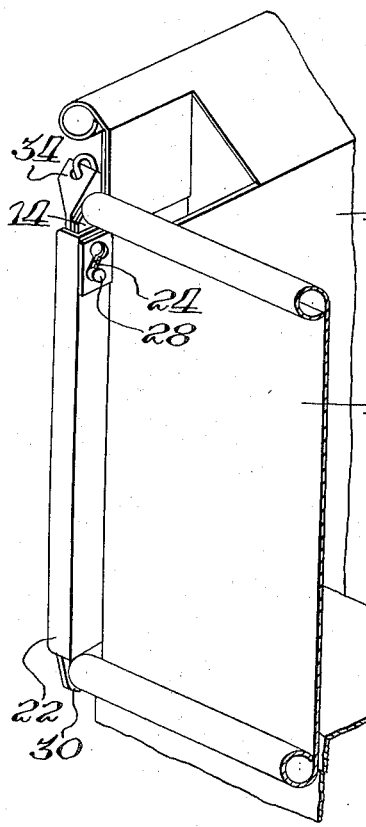
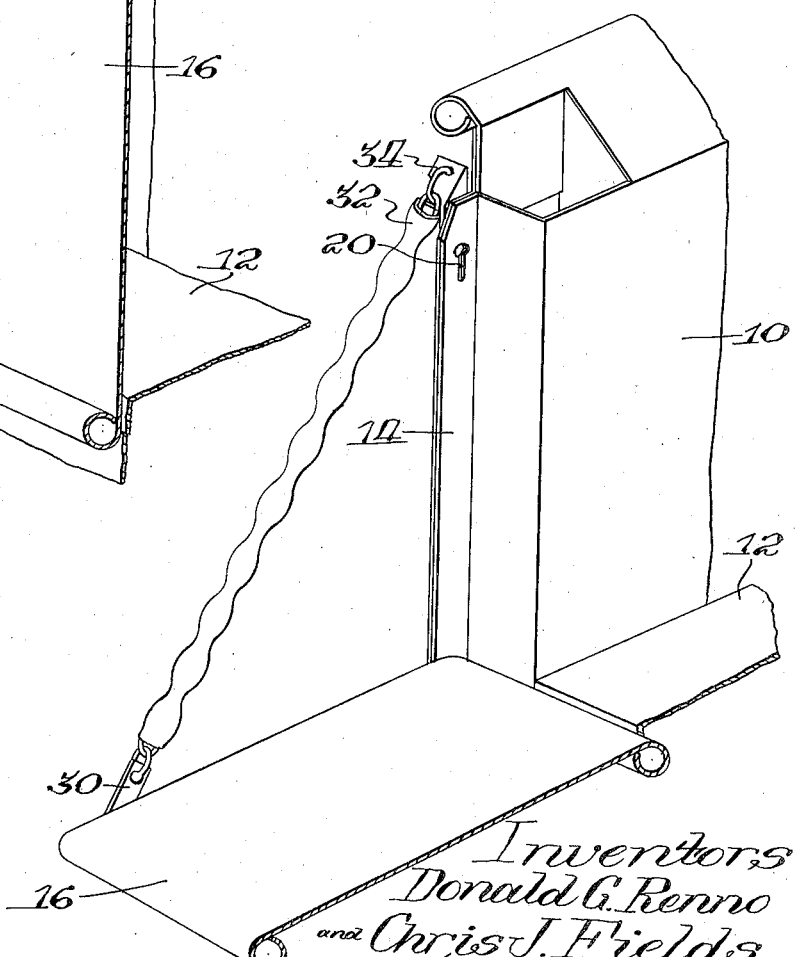

Patented June 18, 1940

2,204,697

UNITED STATES PATENT OFFICE 2,204,697

VEHICLE BODY

Donald G. Renno and Chris J. Fields, Fort Wayne, Ind., assignors to International Harvester Company, a corporation of New Jersey Application July 25, 1939, Serial No. 286,350

8 Claims. (Cl. 296—57)

This invention relates to a locking means for a closure member, and more particularly to a locking means for locking the end-gate of a vehicle body in closed position.

The invention contemplates and has for its principal object the provision of an improved locking means for a vehicle body and end-gate, which means comprises part of a means adapted also to hold the end-gate in an open position.

An important object is to provide a locking means which will remain in place and which will not become dislodged by vibrations set up during the operation of the vehicle.

Another object of the invention is to incorporate the locking means with flexible means for holding the end-gate in open position, whereby the weight of the flexible means, when the end-gate is in closed position, will serve to keep the locking means in locked position.

Another object is to provide the locking means in the form of portions of the vehicle side wall and the end-gate which are adapted to overlap and which have slots formed respectively therein, through which slots a locking member is adapted to be passed, one slot being inclined with respect to the other so that the related sides of the slots are generally off-set, in effect, to narrow widths of the slots to prevent movement of the locking member along the slots.

Briefly and specifically, these and other important objects are achieved in one preferred embodiment of the invention by the provision of a vehicle body which has oppositely disposed side walls and a floor. An end-gate is pivotally attached at its lower end to the side walls on a horizontal axis disposed generally in the plane of the body floor. The end-gate is thus adapted to be swung to and from open and closed positions, and a flexible member in the form of a chain or the like is connected at the upper edge of a side wall and at the upper portion of the end-gate. In a preferable form of the invention, a side wall is formed with a vertical key-hole slot having its larger portion disposed upwardly. The portion in which the slot is formed is disposed generally in the longitudinally vertical plane of the side wall. The end-gate is formed with a similar slot in a portion thereof also disposed in the general plane of the side wall, so that when the end-gate is in closed position the slots are substantially alined. One of the slots is, however, inclined with respect to the other so that a locking member, inserted through the slots in a pre-closed position of the end-gate, is confined to the lower portions of the slot in a completely closed position of the end-gate. The locking member is preferably formed as part of the flexible means and is adapted to engage only the end-gate slot when the end-gate is in open position.

A more complete understanding of the important objects and desirable features of the invention may be had from the following detailed description taken in conjunction with the accompanying sheets of drawings, in which:

Figure 6 is a perspective view of a rear corner of the body showing the end-gate in closed position; and, Figure 7 is a similar view showing the end-gate in open position.

It will be understood that the locking means herein described and illustrated is adapted for use in structures other than vehicle bodies and that a vehicle body and end-gate have been chosen merely for the purposes of illustrating a preferred form of the invention.

Figure 1:
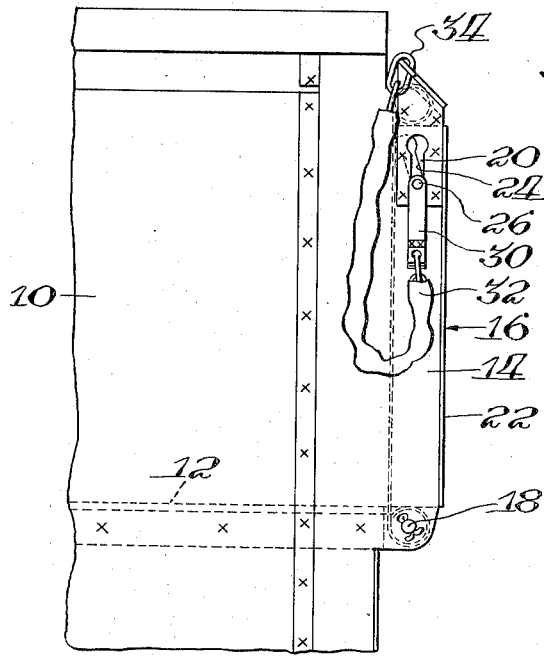
Figure 1 is a side elevational view of a rear portion of a vehicle, showing the end-gate in closed position.
Figures 4, 5:
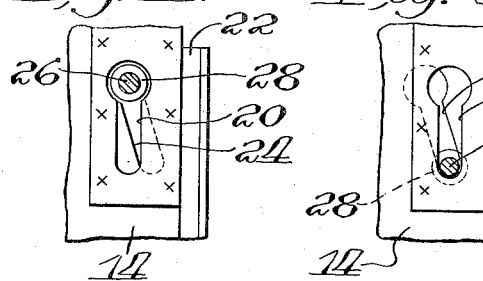
Figure 4 is an enlarged detail view of a portion of the body side wall and end-gate, showing the end-gate in pre-closed position.
Figure 5 is a similar view, showing the end-gate in completely closed position.

The vehicle body is generally illustrated as having a pair of opposite side walls 10 and a floor 12. The rear edge of each side wall is formed with a vertically extending portion 14 formed as an integral part of the wall and providing an off-set portion adapted to receive an end-gate 16 which is pivoted at its lower end on a transverse horizontal axis by a rod 18 to the side walls 10, the axis lying generally in the horizontal plane of the floor 12. The portion 14 on a side wall 10 is disposed parallel to or generally in the plane of the side wall and is formed with a vertically disposed key-hole slot 20 having its larger open portion disposed upwardly and its lower narrower portion disposed downwardly. Each end of the end-gate is formed with opposite end portions 22 disposed respectively in the planes of the portions 14 of the side walls 10, and each of these portions is formed with a substantially vertically disposed key-hole slot 24 having its larger open portion disposed upwardly and its lower narrower portion disposed downwardly; i. e., the slot is substantially vertically disposed when the end-gate is closed. The slot 24 is inclined slightly to the general plane of the end-gate 16 so that when the end-gate is in closed position, the slots 20 and 24 are misalined except at their lower portions. This is best shown in Figures 1 and 5. The inclination of the slot 24 is preferably generally toward the direction of closing of the end-gate 16.

In order to lock the end-gate securely in closed position, a locking means is provided which includes a locking member in the form of a stud 26 having a diameter slightly less than the width of the narrow portions 20 and 24. The locking member or stud 26 is formed with an integral large portion in the form of a head 28, the diameter of the head being slightly less than the width of the larger open portion of the slot. It will thus be seen that the member 26 is adapted to be inserted in a slot through the larger open portion and slid downwardly in the narrower portion, the head 28 serving to prevent the member from escaping outwardly from the slot. The stud 26 is secured at its outer end to a strap member or link 30, which link is in turn secured to a flexible means preferably in the form of a covered chain 32, which is secured at its end, as at 34, to a side wall 10. When the end-gate is in open position, as shown in Figure 7, the chain 32 serves to maintain that position thereof, the locking member engaging only the slot 24 in the end-gate. It will be understood that similar locking means and chains are provided at both sides of the rear end of the body.

When it is desired that the end-gate be moved to closed position, the end-gate is swung about its axis 18 toward the side walls 10. The locking member 26 is moved toward the larger open end of the slot 24 and removed, and continued movement of the end-gate toward closed position moves the same to a pre-closed position, best shown in Figure 4, in which position, the larger open ends of the slots 20 and 24 are alined and the locking member 26 is inserted therethrough. Continued closing of the end-gate provides for misalinement of the larger portions of the slots and successive alinement of the lower portions, the locking member 26 being moved downwardly in the slots to the position shown in Figure 5. In this position, the rear edge of the slot 24 is off-set with respect to the front edge of the slot 20, thus, in effect, narrowing the slots about the member 26 to a width less than the thickness of the diameter of the member.

Figure 2:
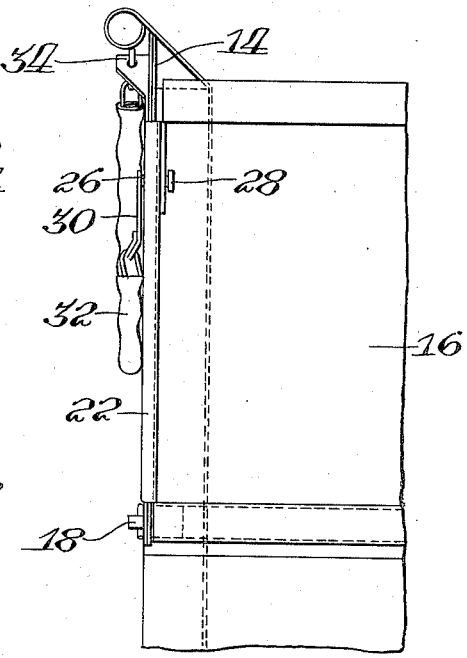
Figure 2 is a rear elevational view of the same, showing one corner of the body.
Figure 3:
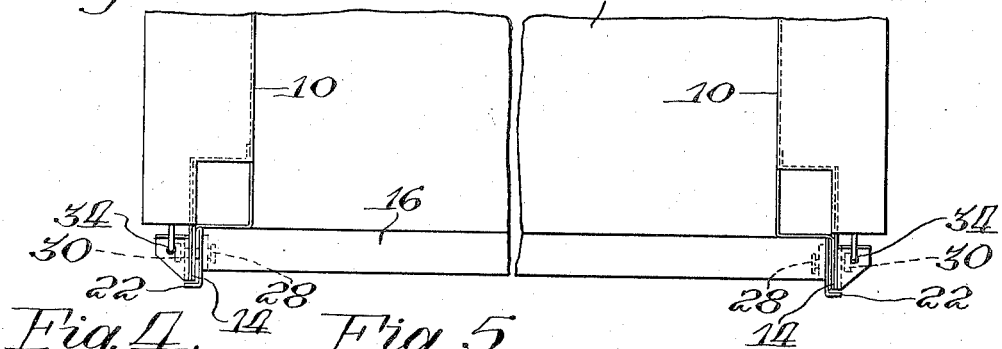
Figure 3 is a plan view of a rear portion of the vehicle body, showing the end-gate in closed position.

As best shown in Figures 1 and 2, the weight of the flexible means or chain 32 is suspended from the locking member, thus serving to maintain the downward position of the member in the slots. The off-set relation of the slots further prevents the locking member 26 from moving upwardly therein even though extreme vibrations may be set up in the vehicle body during operation of the vehicle.

In moving the end-gate from closed to open position, it is necessary merely to move the upper end of the end-gate rearwardly from the side walls, at the same time raising the locking members 26 from the lower portions of the slots to the larger upper portions thereof, whereat the members may be withdrawn from the slots and inserted in only the slots 24 in the portions 22 formed on the end gate 16. The end-gate may thus be swung to the open position shown in Figure 7. It is obvious, of course, that the end-gate may be swung to a still further open position by disengaging the locking members entirely therefrom and permitting the end-gate to hang vertically from and below its axis 18.

From the foregoing description, it will be seen that an improved locking means has been provided for the purpose of attaining the aforesaid and other objects and which includes certain other features apparent to those skilled in the art. It will be apparent also that only a preferred embodiment of the invention has been illustrated and described and that numerous modifications and alterations may be made in the construction disclosed without departing from the spirit and scope of the invention as defined in the appended claims.

What is claimed is:

1. In a truck body having a side wall and a closure element movably carried thereon for movement to and from open and closed positions, the side wall including a portion formed with a slot, the closure element including a portion arranged parallel to the side wall portion when the element is in closed position, said element portion including a slot similar to and adapted to be arranged in substantial coincidence with the first slot when the element is in closed position, the sides of one slot being inclined with respect to the other sides of the other slot when the element is closed, only lower portions of the slots being thereby alined, and a lock member passing through the alined lower portions of both slots, said lock member having a thickness substantially equal to the width of the slots.

2. In a truck body having a side wall and a closure element movably carried thereon for movement to and from open and closed positions, the side wall including a portion formed with a slot, the closure element including a portion arranged parallel to the side wall portion when the element is in closed position, said element portion including a slot similar to and adapted to be arranged in substantial coincidence with the first slot when the element is in closed position, the sides of one slot being inclined with respect to the sides of the other slot when the element is closed, only lower portions of the slots being thereby alined, a lock member passing through the alined lower portions of both slots, said lock member having a thickness substantially equal to the width of the slots, and means maintaining the lock member in locking position when the closure element is closed.

3. In a truck body having a side panel and an end-gate pivoted thereon for swinging movement to and from open and closed positions, a rearward portion of the side panel having a vertical key-hole slot formed therein, the narrower portion of the slot being disposed downwardly, a portion on the end-gate disposed parallel and in close proximity to the slotted panel portion when the end-gate is closed, said endgate portion having a similar key-hole slot formed therein and inclined with respect to the slot in the panel when the end-gate is closed, and a locking member having a thickness at one portion thereon substantially equal to the width of the narrower portion of the slot, and an enlarged integral portion adapted to pass through the larger portion of the slots, said member being inserted through the larger portions of the slots at a pre-closed position of the end-gate, said member being moved to the bottom of the slots when the end-gate is completely closed.

4. In a truck body having a side panel and an end-gate pivoted thereon for swinging movement to and from open and closed positions, a rearward portion of the side panel having a vertical key-hole slot formed therein, the narrower portion of the slot being disposed downwardly, a portion on the end-gate disposed parallel and in close proximity to the slotted panel portion when the end-gate is closed, said end-gate portion having a similar key-hole slot formed therein and inclined with respect to the slot in the panel when the end-gate is closed, and a flexible element secured at one end to the side panel and at its other end including a lock member having a smaller portion of a thickness substantially equal to the narrower width of a slot and an integral larger portion of a thickness substantially equal to the larger width of the slot, said member engaging only the end-gate slot for supporting the end-gate in open position, said member being passed through the larger portions of the slots at a pre-closed position of the end-gate, said member being moved to the bottom of the slots when the end-gate is completely closed, the weight of the flexible means serving to retain the lock member at the bottom of the slots.

5. In a truck body having a side panel and an end-gate pivoted on a horizontal axis for swinging movement to and from open and closed positions, a rear portion of the side panel being disposed in a plane at right angles to the horizontal axis and formed with a vertical key-hole slot having its larger open portion at the top, said end-gate having a portion disposed also in the aforesaid plane and adapted when closed to be arranged in close proximity to the side panel portion, said end-gate portion having a key-hole slot formed therein and inclined to the plane of the end-gate with the larger open portion of the slot being disposed toward the direction of closing, said slots being alined first at their larger portions in a pre-closed position of the end-gate and then at their narrower portions in a completely closed position, and a locking member having a portion substantially fitting the narrower slot portions and an enlarged head substantially fitting the larger slot portions, the member being passed through the larger slot portions in the aforesaid pre-closed position of the end-gate and moved downwardly when the end-gate is completely closed.

6. In a truck body having a side panel and an end-gate pivoted on a horizontal axis for swinging movement to and from open and closed positions, a rear portion of the side panel being disposed in a plane at right angles to the horizontal axis and formed with a vertical key-hole slot having its larger open portion at the top, said end-gate having a portion disposed also in the aforesaid plane and adapted when closed to be arranged in close proximity to the side panel portion, said end-gate portion having a key-hole slot formed therein and inclined to the plane of the end-gate with the larger open portion of the slot being disposed toward the direction of closing, said slots being alined first at their larger portions in a pre-closed position of the end-gate and then at their narrower portions in a completely closed position, and a locking member having a portion substantially fitting the narrower slot portions and an enlarged head substantially fitting the larger slot portions, the member being passed through the larger slot portions in the aforesaid pre-closed position of the end-gate and moved downwardly when the end-gate is completely closed, and means for retaining said locking member downwardly when the end-gate is completely closed.

7. A closure structure comprising a pair of members relatively movable to and from open and closed positions and having closely related, parallel portions, each of said portions having a slot therein, the slot in one portion being inclined with respect to the other slot when the members are moved relatively to a closed position, relative movement of the members alining corresponding ends of the slots at a pre-closed position of the members, continued relative movement of said members toward a completely closed position misalining said slot ends and alining the other slot ends and a lock member passing through the slots at their first alined ends and moving toward their other ends as the members are moved relatively to a completely closed position.

8. A closure structure comprising a stationary member having a wall portion formed with a slot therein, a closure member movably associated with the stationary member for movement to and from open and closed positions, said closure member having a portion formed with a slot therein, said portion when the closure member is closed being disposed parallel and in close proximity to the wall portion, one end of one slot being alined with one end of the other slot and the other end of the first slot being off-set with respect to the other end of the other slot and a locking member passing through the alined ends of the slots.

DONALD G. RENNO.
CHRIS J. FIELDS.